3,509,257
METHOD FOR CONTROL OF COCCIDIOSIS EMPLOYING QUINOLINE CARBOXYLIC ACIDS AND ESTERS THEREOF
Daniel Kaminsky, East Paterson, and Robert I. Meltzer, Rockaway, N.J., assignors to Warner-Lambert Pharmaceutical Company, Morris Plains, N.J., a corporation of Delaware
No Drawing. Filed July 20, 1967, Ser. No. 654,685
Int. Cl. A01n 9/00, 9/22; A61k 27/00
U.S. Cl. 424—258                    1 Claim

ABSTRACT OF THE DISCLOSURE

A method for control of coccidiosis in animals, which comprises feeding to animals about 0.001% to about 1% by weight of a compound of the formula:

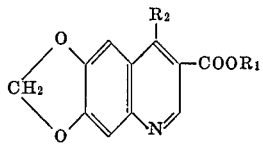

wherein $R_1$ is hydrogen, or lower alkyl; and $R_2$ is hydroxy, or halogen.

---

The present invention relates to a novel method for the control of coccidiosis in animals particularly livestock, such as poultry, sheep, cattle, and the like. More particularly, this invention relates to a novel method for the control of coccidiosis in livestock, by feeding to these animals a compound of the Formula I:

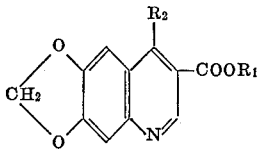

wherein $R_1$ is hydrogen or lower alkyl of 1 to 6 carbon atoms, such as methyl, ethyl, propyl, isopropyl, and the like; and $R_2$ represents hydroxy or halogen, e.g. chlorine, fluorine, bromine, and iodine.

Coccidiosis is a common disease in livestock caused by the protozoa coccidia. This disease, when un-checked, results in the loss of the entire livestock colony.

We have now found a novel method for the control of coccidiosis by administering to livestock a compound of the Formula I in the manner described below.

Those compounds of Formula I wherein $R_2$ is hydroxy is prepared in accordance with the disclosure set forth in U.S. Patent 3,287,458, issued Nov. 22, 1966. Those compounds wherein $R_2$ is halogen is prepared by treating those compounds wherein $R_2$ is hydroxy with a phosphorous halide, for example, phosphorous oxychloride. This conversion is specifically disclosed in Example 1.

Broadly speaking, the method of this invention comprises administering to livestock about 0.001% to about 1% by weight of the above compound several times daily. They may be administered in the form of tablets, powders, capsules, injections and the like. These dosage forms may be prepared by combining the active ingredient with a known pharmaceutical carrier, such as dicalcium phosphate, mannitol, and the like, and compounded in accordance with the known pharmaceutical art.

Preferably, the method of our invention comprises incorporating 0.001% by weight to 1% by weight of the above compound as part of the diet of the livestock to be treated. For example, the selected active ingredient may be blended with water, corn meal, or other animal feed which are to be given to the livestock. Animals after receiving such diets containing compound I, or via other routes are immune from coccidiosis.

The following examples are included in order further to illustrate the invention.

EXAMPLE 1

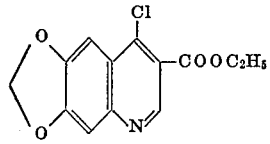

Ethyl 8-chloro-1,3-dioxolo[4,5-g]quinoline-7-carboxylate

A mixture of 6.5 g. (0.025 mole) of ethyl 8-hydroxy-1,3-dioxolo[4,5-g]quinoline-7-carboxylate, 20 ml. of phosphorous oxychloride and 100 ml. toluene is refluxed for 4 hrs. The residue is triturated with 200 ml. 5% sodium bicarbonate solution and is recrystallized from ligroin (a hydrocarbon) (B.P. 90–120°) to yield 6.0 g. (86%) of light yellow crystals, M.P. 106–108° C.

EXAMPLE 2

8-chloro-1,3-dioxolo[4,5-g]quinoline-7-carboxylic acid

The ester prepared according to Example 1 is heated at reflux with 20 times its weight of 20% hydrochloric acid for 2 hrs., cooled and filtered. The crude solid is dissolved in 5% aqueous sodium bicarbonate solution, filtered and acidified with acetic acid to yield 8-chloro-1,3-dioxolo[4,5-g]quinoline-7-carboxylic acid M.P. 316–320°.

EXAMPLE 3

Ethyl 8-hydroxy-1,3-dioxolo[4,5-g]quinoline-7-carboxylate

See U.S. Patent 3,287,458.

EXAMPLE 4

8-hydroxy-1,3-dioxolo[4,5-g]quinoline-7-carboxylic acid

The ethyl ester prepared according to Example 3 is hydrolyzed by refluxing in aqueous sodium hydroxide solution for several hours, filtered hot and the filtrate acidified to yield the free acid as a light tan colorless crystalline material, M.P. 315–316° (decomposes).

EXAMPLE 5

100 parts of 3-carboxy-6,7-methylenedioxy-4-hydroxyquinoline mixed with 1000 parts of peanut oil. The mixture is then filled into soft gelatine capsules having a volume of about 5 ml. These capsules can be fed to animals to be treated.

EXAMPLE 6

100 parts of ethyl 8-hydroxy-1,3-dioxolo[4,5-g]quinoline-7-carboxylate mixed with 1000 parts of peanut oil. The mixture is then filled into soft gelatine capsules having a volume of about 5 ml. These capsules can be fed to animals to be treated.

EXAMPLE 7

100 parts of 8-hydroxy-1,3-dioxolo[4,5-g]quinoline-7-carboxylic acid mixed with 1000 parts of peanut oil. The mixture is then filled into soft gelatine capsules having a volume of about 5 ml. These capsules can be fed to animals to be treated.

It is understood that the foregoing detailed description is given merely by way of illustration and that many variations may be made therein without departing from the spirit of our invention.

Having described our invention, what we desire to secure by Letters Patent is:

1. A method for the control of coccidiosis in livestock, which comprises orally administering to said livestock a coccidiostatically effective amount of a compound of the formula:

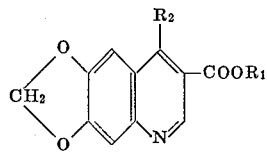

wherein $R_1$ is hydrogen or lower alkyl; and $R_2$ is hydroxy or halogen.

References Cited

UNITED STATES PATENTS

| | | | |
|---|---|---|---|
| 3,267,106 | 8/1966 | Watson | 424—258 |
| 3,287,458 | 11/1966 | Kaminsky et al. | 424—266 |
| 3,314,965 | 4/1967 | Stanaback et al. | 424—258 |

ALBERT T. MEYERS, Primary Examiner

V. D. TURNER, Assistant Examiner